A. H. FIHN.
SLEIGH ATTACHMENT.
APPLICATION FILED JAN. 31, 1913.
1,189,678.
Patented July 4, 1916.
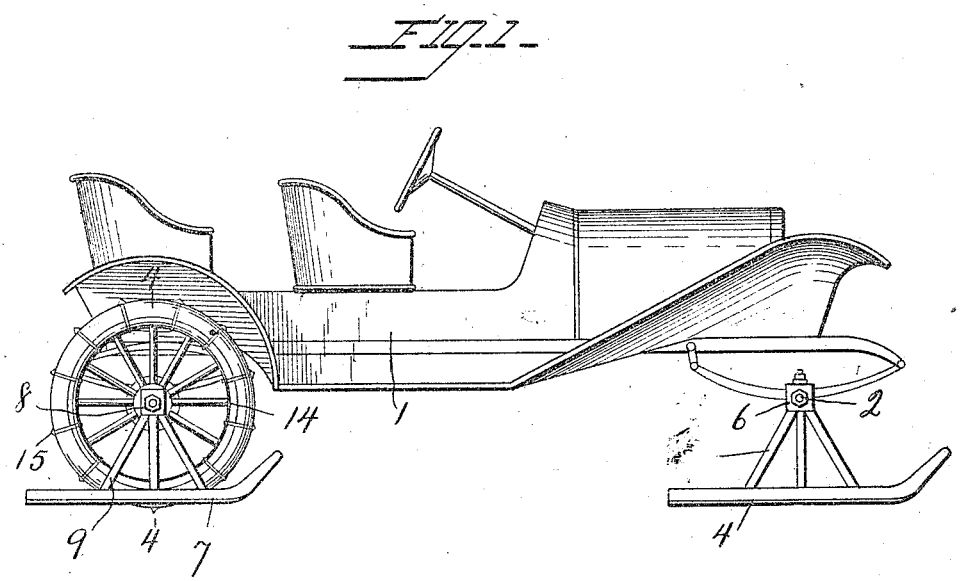
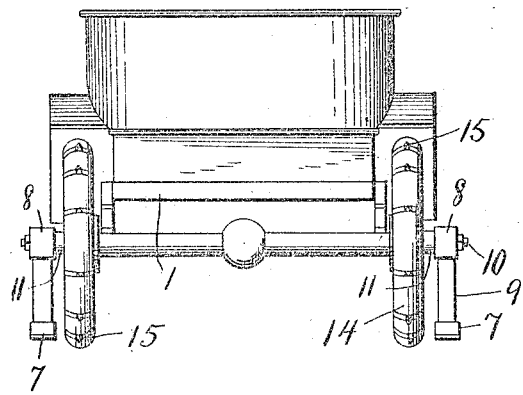
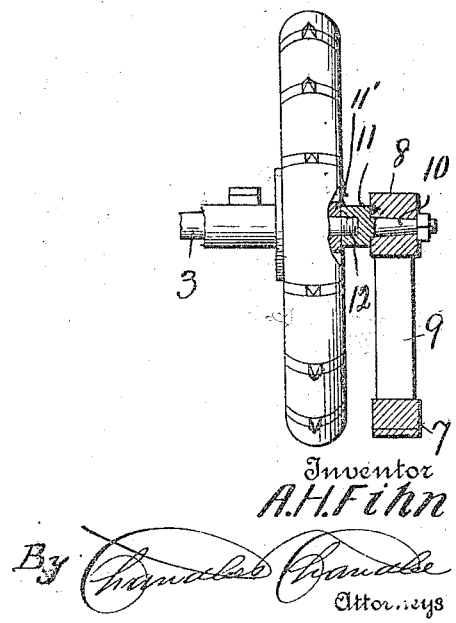
Inventor
A. H. Fihn

UNITED STATES PATENT OFFICE.

ALBERT H. FIHN, OF FARIBAULT, MINNESOTA.

SLEIGH ATTACHMENT.

1,189,678. Specification of Letters Patent. Patented July 4, 1916.

Application filed January 31, 1913. Serial No. 745,476.

*To all whom it may concern:*

Be it known that I, ALBERT H. FIHN, a citizen of the United States, residing at Faribault, in the county of Rice, State of Minnesota, have invented certain new and useful Improvements in Sleigh Attachments; and I do hereby declare the following to be a full, clear, and exact description of the invention, such as will enable others skilled in the art to which it appertains to make and use the same.

The present invention is directed to improvements in sleigh attachments for automobiles, and has for its object to so construct a device of this character that the same may be easily and quickly attached to an automobile.

A further object of the invention is to provide a device of this character which may be adjusted to the rear axle of an automobile without molesting the rear wheels thereof.

With these and other objects in view, this invention resides in the novel features of construction, formation, combinations and arrangement of parts to be hereinafter more fully described, claimed and illustrated in the accompanying drawing, in which:

Figure 1 is a side elevation of an automobile equipped with the attachment. Fig. 2 is a rear elevation. Fig. 3 is a sectional view on line 4—4 of Fig. 1.

Referring to the drawing the numeral 1 designates the chassis of an automobile provided with the usual front and rear axles 2 and 3.

The front runners 4 are provided with upwardly extending braces 5 which support boxes 6, said boxes being suitably connected to the spindles of the front axles upon removal of the front wheels.

The rear runners 7 are provided with boxes 8, which are supported by the braces 9, and are adapted to receive the spindles 10, of the axle extensions 11 which extensions have their inner ends formed with circular enlargements which are provided with interiorly threaded sockets 12.

In applying the rear runners to the rear axle 3, the usual nuts are removed from the threaded ends of the axle. The extensions 11 are then screwed onto the threaded ends, which latter extend into the sockets 12 and abut against the ends of the hubs 11' of the wheels. It is to be noted in this connection that the threaded ends of the axle 3 extend beyond the ends of the hubs as illustrated in Fig. 3 of the drawing. The runners 7 are placed upon the spindles 10, which spindles are located and held loosely within the boxes 8 and are thus permitted to rotate with the rear axle 3.

The rear wheels 14 will be retained upon the axles 3 by the spindles 10. Each of the rear runners 7 is so constructed that the tires of the rear wheels will, during their travel, be slightly below said runners so that the removable cleats 15, carried by the tire, will effectually engage the snow or ice to propel the automobile when movement is imparted to the rear axles in the usual manner.

From the foregoing description, it will be seen that an attachment for automobiles has been provided which can be easily and quickly applied without the necessity of removing the rear wheels, and that a device has been produced which does not necessitate the application of separate driving wheels or the like.

What is claimed is:—

The combination with a wheel including a hub and an axle extending through said hub and having a threaded end extending beyond the same, of an axle extension mounted on the threaded end of said axle and butting against the end of the hub and a runner mounted on said extension.

In testimony whereof, I affix my signature, in the presence of two witnesses.

ALBERT H. FIHN.

Witnesses:
   H. A. SWARTWOOD.
   E. H. GIPRON.